(12) United States Patent
Yang et al.

(10) Patent No.: US 11,577,281 B2
(45) Date of Patent: Feb. 14, 2023

(54) CLEANING APPARATUS AND CLEANING METHOD FOR PRESS ROLLS FOR ELECTRODES

(71) Applicant: LG Chem, Ltd., Seoul (KR)

(72) Inventors: Seung Gi Yang, Daejeon (KR); Kun Ha Park, Daejeon (KR); Ung Ju Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/252,544

(22) PCT Filed: Jan. 30, 2020

(86) PCT No.: PCT/KR2020/001381
§ 371 (c)(1),
(2) Date: Dec. 15, 2020

(87) PCT Pub. No.: WO2020/159235
PCT Pub. Date: Aug. 6, 2020

(65) Prior Publication Data
US 2021/0252559 A1    Aug. 19, 2021

(30) Foreign Application Priority Data

Jan. 30, 2019    (KR) .......................... 10-2019-0011736

(51) Int. Cl.
*B08B 1/04*    (2006.01)
*B08B 3/02*    (2006.01)
*B08B 7/04*    (2006.01)

(52) U.S. Cl.
CPC ................ *B08B 1/04* (2013.01); *B08B 3/024* (2013.01); *B08B 7/04* (2013.01); *B08B 2240/00* (2013.01)

(58) Field of Classification Search
CPC .. B08B 1/04; B08B 3/024; B08B 7/04; B08B 2240/00; B08B 3/041; B08B 1/005;
(Continued)

(56) References Cited

U.S. PATENT DOCUMENTS 7,817,951 B2    10/2010    Takiguchi et al.
2006/0266380 A1    11/2006    Yamanaka et al.
2007/0130713 A1*    6/2007    Chen ..................... A47L 13/256
15/228

FOREIGN PATENT DOCUMENTS

CN    103008297 A    4/2013
CN    203578252 U    5/2014
(Continued)

OTHER PUBLICATIONS

Machine translation of CN 205732065 (Year: 2016).*
(Continued)

*Primary Examiner* — Erin F Bergner
(74) *Attorney, Agent, or Firm* — Lerner, David, Littenberg, Krumholz & Mentlik, LLP

(57) ABSTRACT

The present invention relates to an apparatus for cleaning press rolls for electrodes, comprising two or more cleaning units provided with cleaning members having grains. According to the present invention, the apparatus for cleaning press rolls for electrodes comprises a plurality of, i.e., two or more, cleaning units, wherein the cleaning units respectively comprise cleaning members having grains with different directions, thus allowing a residual cleaning solution and contaminants to be effectively removed. In addition, when press rolls are cleaned using the apparatus for cleaning press rolls according to the present invention, an aqueous cleaning solution and an alcoholic cleaning solution, which have different properties, can be used together, and after cleaning, the cleaning solutions do not remain on the press rolls, and thus subsequently, secondary contamination of

(Continued)

(a)

(b)

(c)

(d)

electrodes is prevented, and accordingly, when electrodes are manufactured, the occurrence of defects in the electrodes can be reduced.

11 Claims, 3 Drawing Sheets

(58) Field of Classification Search
CPC  B08B 1/006; B08B 1/008; B08B 1/02; B08B 5/023; B08B 3/022; B08B 3/08; B08B 3/14; B08B 5/026; H01M 4/0435; Y02E 60/10; B21B 27/10; B21B 28/02; B21B 27/106; B21B 2203/18
See application file for complete search history.

(56) References Cited

FOREIGN PATENT DOCUMENTS

| CN | 205146738 U | | 4/2016 | |
| CN | 205732065 | * | 11/2016 | ............... B08B 1/04 |
| CN | 207386166 U | | 5/2018 | |
| CN | 207857414 U | | 9/2018 | |
| CN | 208213720 U | | 12/2018 | |
| EP | 1738908 A2 | | 1/2007 | |
| JP | H10146606 A | | 6/1998 | |
| JP | 2000305402 A | | 11/2000 | |
| JP | 3680185 B2 | | 8/2005 | |
| JP | 2007000860 A | | 1/2007 | |
| JP | 2012245492 A | | 12/2012 | |
| JP | 2013123666 A | | 6/2013 | |
| JP | 2013188685 A | * | 9/2013 | |
| JP | 2016051648 A | | 4/2016 | |
| JP | 2017060928 A | | 3/2017 | |
| KR | 101378563 B1 | | 3/2014 | |
| KR | 20140119484 A | | 10/2014 | |
| KR | 20150045231 A | | 4/2015 | |
| KR | 20150049467 A | | 5/2015 | |
| KR | 20160083716 A | | 7/2016 | |
| KR | 101747508 B1 | | 6/2017 | |

OTHER PUBLICATIONS

Machine translation of JP-2013188685 (Year: 2013).*
International Search Report for Application No. PCT/KR2020/001381 dated May 20, 2020, 2 pages.
Extended European Search Report including Written Opinion for Application No. 20749660.5 dated Jul. 6, 2021, pp. 1-9.
Search Report dated May 17, 2022 from Office Action for Chinese Application No. 202080003275.4 dated May 26, 2022. 3 pgs.

* cited by examiner

CLEANING APPARATUS AND CLEANING METHOD FOR PRESS ROLLS FOR ELECTRODES

CROSS-REFERENCE TO RELATED APPLICATIONS

The present application is a national phase entry under 35 U.S.C. § 371 of International Application No. PCT/KR2020/001381, filed on Jan. 30, 2020, which claims priority to Korean Patent Application No. 10-2019-0011736, filed on Jan. 30, 2019, the disclosures of which are incorporated herein by reference.

TECHNICAL FIELD

The present invention relates to an apparatus for cleaning an electrode rolling roll, which is used in an electrode manufacturing process, and more particularly, to an apparatus for cleaning an electrode rolling roll including two or more cleaning part provided with a cleaning member having grains formed thereon.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an electrode mixture containing an electrode active material to a surface of a current collector, then a separate is interposed therebetween to thereby make an electrode assembly, which is then mounted in a cylindrical or rectangular metal can or inside a pouch-type case of an aluminum laminate sheet, and a liquid electrolyte in injected or impregnated into the electrode assembly or a solid electrolyte to prepare a secondary battery.

Further, secondary batteries are classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound with a separator sheet.

On the other hand, the electrode generates a current through the exchange of ions, and the positive electrode and negative electrode constituting the electrode has a structure in which the electrode active material is applied to the electrode current collector made of metal.

The separator is positioned between the positive electrode and the negative electrode of the battery to perform insulation and maintain the electrolyte to provide a passage for ion conduction.

The roll press process, the slitting process, the notching process, the lamination process, or the folding process for manufacturing the electrode and the separator and the like are mostly performed by a roll-to-roll process. Herein, the roll-to-roll process refers to a process in which a plurality of bendable metal foils and the like move between rollers and perform a process such as coating and printing.

That is, for example, by unwinding the roll winding the flexible, a thin sheet-like material, materials are supplied, the supplied materials are coated and printed, and then materials processed from another roll are rewound and retrieved. In particular, positive and negative electrodes for secondary batteries are made by applying a positive electrode active material or a negative electrode active material on a sheet and rolling the sheet.

In this rolling process, when rolling is repeatedly performed, if active materials or other foreign materials remaining after rolling are attached to the roll during rolling, foreign materials may adhere to the electrode in the subsequent rolling process, thereby reducing the quality of the electrode and the battery including the same. As such, an apparatus for cleaning a rolling roll by removing contaminants of a rolling roll is used.

DISCLOSURE

Technical Problem

It is an object of the present invention to solve the above-mentioned problems of the prior art and the technical problems required from the past.

Specifically, the electrode rolling roll cleaning apparatus according to the present invention includes two or more cleaning parts having cleaning members having different grain directions. An object of the present invention is to provide an electrode rolling roll cleaning apparatus with improved cleaning power by improving the disadvantage that the cleaning of the electrode rolling roll was not sufficient in the existing cleaning apparatus, through the complementary operation of a plurality of cleaning parts.

Technical Solution

In order to achieve the above object, a cleaning apparatus according to the present invention may include the following configuration.

Specifically, the cleaning apparatus according to the present invention is an apparatus for cleaning an electrode rolling roll by removing contaminants attached on the electrode rolling roll, and the apparatus may include:

a first cleaning part configured to bring the rolling roll into contact with the cleaning member to thereby clean the rolling roll; and a second cleaning part configured to clean the rolling roll by bringing the rolling roll cleaned by the first cleaning part into contact with the cleaning member to thereby clean the rolling roll, and grains having different directions may be formed on cleaning members of the first and second cleaning parts.

Meanwhile, each of the first and second cleaning parts may be provided with a cleaning member, and may include a supply roll, a cleaning unit, a cleaning liquid spray unit, and a winding roll.

Specifically, each of the first and second cleaning parts may include: a supply roll configured to supply a cleaning member;

a cleaning unit configured to bring the cleaning member into contact with the rolling roll to thereby clean a surface of the rolling roll;

a cleaning liquid spray unit configured to spray cleaning liquid onto the cleaning member; and a winding roll configured to recover the cleaning member having cleaned the surface of the rolling roll.

At this time, the cleaning member may be non-woven fabric.

Further, a direction of a grain formed on the cleaning member may be formed to have preferably an angle of 0 to 90 degrees with respect to a moving direction of the cleaning member during cleaning. Specifically, a direction of a grain formed on the cleaning member may be formed to have more preferably an angle of 30 to 60 degrees, and most preferably an angle of 40 to 50 degrees with respect to a moving direction of the cleaning member during cleaning.

Further, directions of grains formed on cleaning members of the first and second cleaning parts may intersect each other with preferably an angle of 60 to 120 degrees. Specifically, directions of grains formed on cleaning members of the first and second cleaning parts may intersect each other with more preferably an angle of 80 to 100 degrees, and most preferably an angle of 85 to 95 degrees.

The electrode rolling roll cleaning apparatus may further include a scraping pad for scraping off foreign materials attached to a surface of the rolling roll. The scraping pad is in contact with the rolling roll and continuously removes contaminants according to the rotation of the rolling roll while the cleaning apparatus is operating. At this time, it is possible to install one or more scraping pads before the first cleaning part, between the first cleaning part and the second cleaning part, and after the second cleaning part.

Further, the electrode rolling roll cleaning apparatus may further include an air spray unit for spraying air to a surface of the rolling roll in order to remove liquid contaminants and/or residual cleaning liquid attached to the surface of the rolling roll.

In addition, the electrode rolling roll cleaning apparatus may further include a heating unit for drying the rolling roll by applying heat to a surface of the rolling roll. The electrode rolling roll cleaning apparatus of the present invention may include a heating unit, thereby drying and removing moisture remaining on the surface of the rolling roll by heat, thereby further improving the efficiency of the cleaning operation.

Meanwhile, the cleaning liquid sprayed to the cleaning member may contain one or two or more selected from the group consisting of water and alcohol-based compounds, and water and/or alcohol-based compounds may be used alone or in combination as the cleaning liquid.

In particular, according to an embodiment of the present invention, the cleaning power may be further improved by using a cleaning liquid containing water in the first cleaning part, and in the second cleaning part, which secondarily cleans the rolling roll cleaned by the first cleaning part, a cleaning liquid containing an alcohol-based compound that is rapidly vaporized can be used to quickly remove moisture generated in the cleaning process.

The cleaning method of the electrode rolling roll for removing contaminants attached to the electrode rolling roll according to the present invention may include the following steps.

a cleaning preparation step of preparing two or more cleaning members having different grain directions;

a cleaning liquid spray step of spraying a cleaning liquid to the cleaning member;

a cleaning step of cleaning the surface of the rolling roll by sequentially bringing the cleaning member sprayed with the cleaning liquid into contact with the rolling roll.

At this time, in the electrode rolling roll cleaning method, the following steps may be further included as necessary.

a scraping step of scraping off foreign materials attached to the surface of the electrode roll;

an air spray step of spraying air on the surface of the electrode rolling roll to remove residual materials;

a drying step of drying by applying heat to the surface of the electrode rolling roll.

One or more of the scraping step, the air spray step, and the drying step may be further added to the rolling roll cleaning method of the present application, and may be added before or after the cleaning preparation step, depending on conditions such as efficiency of the entire process and/or apparatus type.

Advantageous Effects

The cleaning apparatus for the electrode rolling roll according to the present invention includes two or more cleaning parts, and each of the cleaning parts includes cleaning members having different grain directions. As such, residual cleaning liquid and contaminants can be effectively removed. Further, it is possible to use both water-based and alcohol-based cleaning liquid with different characteristics, and there is no residual cleaning liquid left on the roll after cleaning, thereby preventing secondary contamination of the electrode and reducing the incidence of defects during electrode manufacturing.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In the present specification, when it is said that a "grain" is formed on a cleaning member and/or a non-woven fabric, this means a pattern of a grain shape formed on a fabric and/or a non-woven fabric according to a manufacturing method such as a weaving or web bonding method. For example, in the case of a nonwoven fabric used as a cleaning member according to an embodiment of the present invention, it is manufactured by a method of forming a web without weaving and then pressing it, and depending on the manufacturing method, a grain may or may not be formed.

In the present specification, when a part is "connected" to another part, this includes not only "directly connected" but also "electrically connected" between the parts while having another element therebetween.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

As used throughout this specification, the terms "about", "substantially", and the like, are used to mean a value or something like this when unique manufacturing and material tolerances are presented, and the terms are used to prevent unscrupulous infringers from unfair use of the disclosure including accurate or absolute figures in order to aid in the understanding of the present disclosure.

Throughout this specification, the term "combination(s) thereof" included in the expression of the Markush form means one or more mixtures or combinations selected from the group consisting of the elements described in the Markush form representation, and it means to include one or more selected from the group consisting of the above components.

Hereinafter, the present invention will be described in detail.

Figure 1:
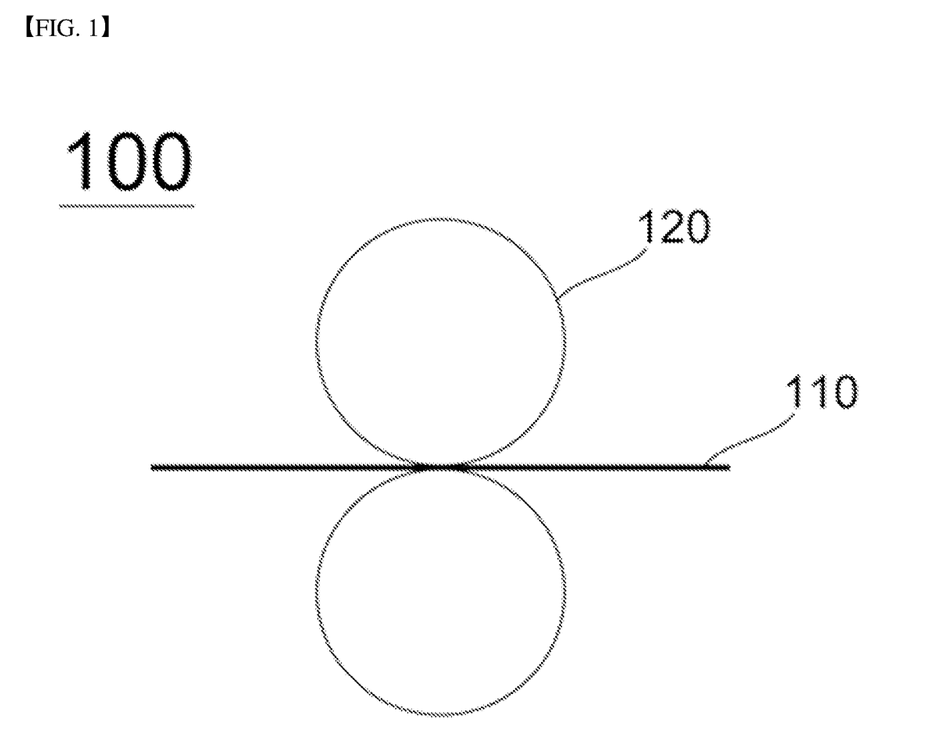
FIG. 1 shows an electrode rolling device that is commonly used.

FIG. 1 is a view showing a rolling device of a general electrode.

Referring to FIG. 1, the rolling device 100 of a general electrode allows the electrode 110 coated with the electrode mixture containing the electrode active material to pass through a space between a rolling roll 120 including an upper roll and a lower roll, to thereby perform a rolling process of the electrode. Therefore, when the foreign material or the electrode mixture is attached to the rolling roll 120 in the rolling process as described above, the electrode may be contaminated due to the attached foreign material or the electrode mixture in the rolling process of another electrode, which is not preferable.

Figure 2:
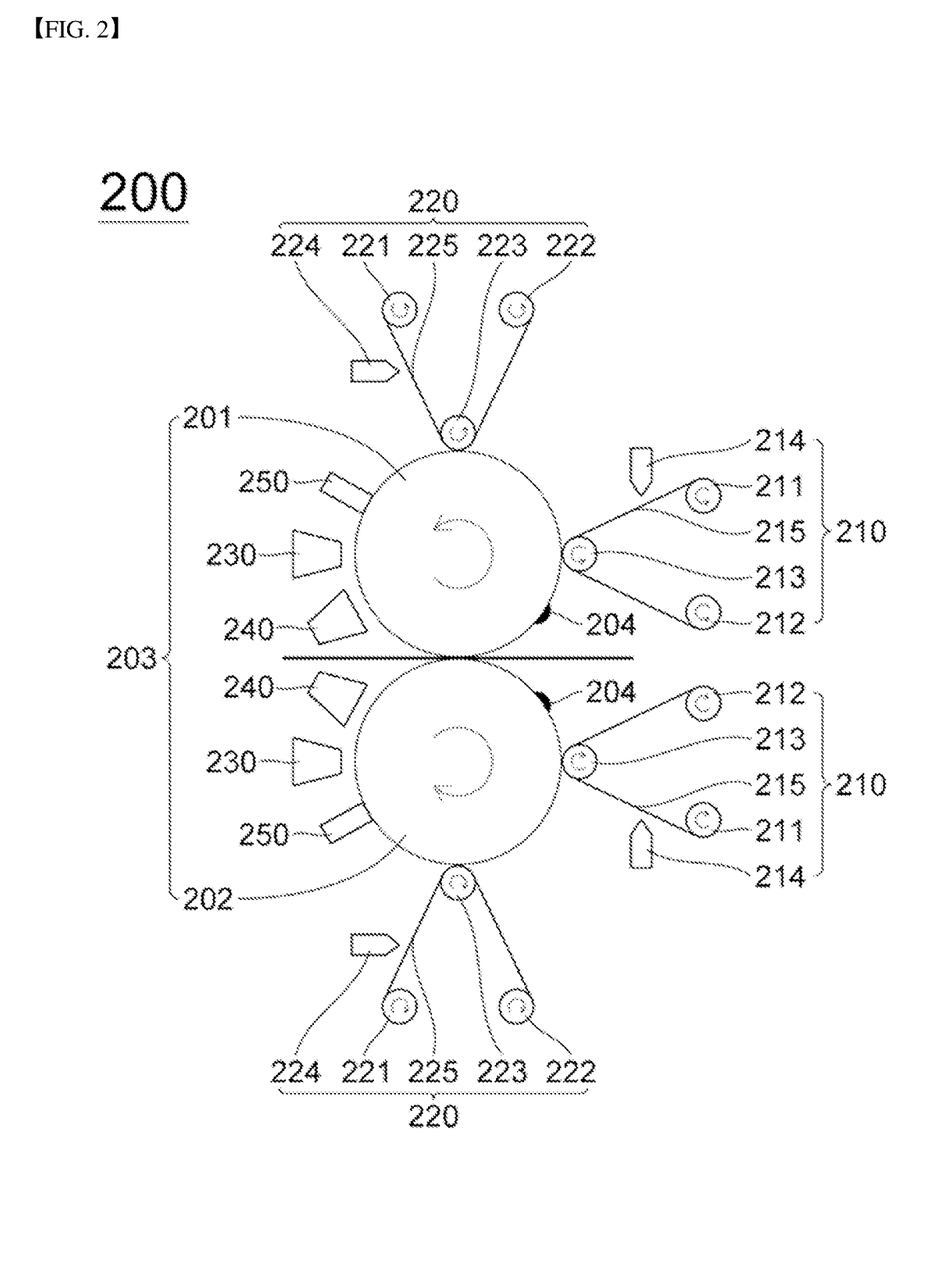
FIG. 2 shows an electrode rolling roll cleaning apparatus of the present invention.

FIG. 2 is a schematic view schematically showing an apparatus for cleaning an electrode rolling roll according to an embodiment of the present invention.

Referring to FIG. 2, the electrode rolling roll cleaning apparatus 200 according to the present invention includes the following configuration to remove foreign materials that may occur while performing the rolling of the electrode.

The electrode rolling roll cleaning apparatus 200 according to the present invention is an apparatus for simultaneously performing cleaning of a rolling roll 203 while performing the rolling process of the electrode using the rolling roll 203 including an upper roll 201 and a lower roll 202, and is specifically used to remove foreign materials 204 which are generated as active materials and/or additives applied on the electrode current collector are attached to the surface of the rolling roll. Therefore, when using the rolling roll cleaning apparatus 200 according to the present invention, it is possible to prevent the phenomenon of secondary contamination of the electrode due to the rolling roll with foreign substances attached thereto, and accordingly, an electrode of good quality can be continuously produced without stopping the process for cleaning the rolling roll.

To this end, the rolling roll cleaning apparatus 200 of the present invention includes a first cleaning part 210 and a second cleaning part 220 for removing foreign materials 204.

The first cleaning part 210 and the second cleaning part 220 may include supply rolls 211 and 221, winding rolls 212 and 222, cleaning units 213 and 223, and cleaning liquid spray units 214 and 224, and cleaning members 215 and 225, respectively. Herein, the first and second cleaning parts 210 and 220 remove foreign materials 204 by using the cleaning members 215 and 225 while being in direct contact with the rotating rolling roll 203 in the order of the first cleaning part 210 and the second cleaning part 220.

At this time, the cleaning members 215 and 225 are supplied by supply rolls 211 and 221, are wound by winding rolls 212 and 222, and clean the rolling roll 203 while passing through the cleaning units 213 and 223 which are located between the supply rolls 211 and 221 and the winding rolls 212 and 222 and are adjacent to the rolling roll 203.

Meanwhile, a fabric and/or a non-woven fabric may be used as the cleaning members 215 and 225, and there is no limitation on the kind of the material, but a non-woven fabric that is easy to control characteristics of the cleaning member is preferable. Specifically, according to an embodiment of the present invention, the cleaning members 215 and 225 can smoothly absorb and/or remove attached foreign materials, and a nonwoven fabric, which has an excellent cleaning ability while not damaging the surface of the rolling roll 203, may be preferably used. In addition, the material of the non-woven fabric is not limited in its kind as long as it can absorb or remove foreign substances. One, two or more selected from the group consisting of cotton, polyethylene, polypropylene, polyester, polyethylene terephthalate, aramid, cellulose, and rayon can be used in combination. Specifically, according to an embodiment of the present invention, a mixture of viscose rayon and polyethylene terephthalate in a weight ratio of 8:2 may be used as a nonwoven fabric.

A cleaning liquid may be applied to the cleaning members 215 and 225 to further improve the cleaning ability. The cleaning liquid may be sprayed onto the cleaning members 215 and 225 from the cleaning liquid spray units 214 and 224 located between the winding rolls 211 and 221 and the cleaning units 213 and 223.

The cleaning liquid may be used by mixing one or two or more types of water and alcohol-based compounds. However, in the cleaning process by the rolling roll cleaning apparatus of the present invention, the cleaning is performed consecutively by the first cleaning part 210 and the second cleaning part 220. According to an embodiment of the present invention, even if a cleaning liquid mainly containing purified water having excellent cleaning power but having poor evaporation is used for the first cleaning part 210, the cleaning liquid remaining in the second cleaning part 220 can be wiped out, thereby further improving the cleaning efficiency. In addition, since the rolling roll 203 cleaned by the second cleaning part 220 performs an electrode rolling operation again, it is preferable to use an alcohol-based cleaning liquid having excellent vaporization power as much as possible.

In particular, the alcohol-based cleaning liquid preferably contains alcohol having 4 or more carbon atoms so as not to ignite even when the temperature of the rolling roll increases due to a long-term rolling process, and most preferably may include octanol.

Meanwhile, in order to further improve the cleaning power for the rolling roll, the rolling roll cleaning apparatus of the present invention may selectively further include: an air spray unit 230 for spraying air to a rolling roll 203; a heating unit 240 for drying the rolling roll 203 by applying heat to the rolling roll 203; and a scraper pad 250 for mechanically removing residual cleaning liquid and foreign materials 204 attached to the rolling roll 203, in addition to the first cleaning part and the second cleaning part.

FIG. 2 illustrates an embodiment of a rolling roll cleaning apparatus 200 according to the present invention further including an air spray unit 230, a heating unit 240, a scraper pad 250 in addition to the first cleaning part 210 and the second cleaning part 220. Referring to FIG. 2, the remaining cleaning liquid and/or foreign materials are first scraped off from the rolling roll 203 having been cleaned through first and second cleaning part 210 and 220, through the scraper pad 250, then the remaining cleaning liquid is blown off by spraying air using the air spray unit 230, and finally, in the heating unit, heat is applied to the surface of the rolling roll 203 to dry and evaporate minute moisture remaining on the surface. However, the order of each step can be appropriately changed according to the efficiency of the process and the size of each step, and the present invention should not be interpreted as being limited to one embodiment shown in FIG. 2.

On the other hand, the first cleaning part 210 and the second cleaning part 220 of the rolling roll cleaning apparatus 200 of the present invention may include cleaning members 215 and 225 having different grain directions, respectively.

According to a preferred embodiment of the present invention, nonwoven fabric may be used as both the cleaning member 215 used for the first cleaning part 210 and the cleaning member 225 used for the second cleaning part 220.

The nonwoven fabric is made in a felt shape by arranging in parallel or randomly without direction, without going through the process of weaving in the process of forming the fabric, and then bonding with a synthetic resin adhesive. Non-woven fabrics may be manufactured in various methods such as chemical bonding, thermal bonding, air ray, wet ray, needle punching, spun bond, stitch bond, etc., depending on how the yarns are combined.

In addition, it is possible to impart various physical properties such as filterability, heat retention, moldability, water absorption, insulation, and discharge property by variously applying the material of the yarn and the manufacturing method as described above according to the usage and purpose.

On the other hand, the grain may or may not be formed on the produced nonwoven fabric, and this depends on the manufacturing method of the nonwoven fabric. When the grain is formed, it can be classified into an OB type, a CB type, and an MB type according to the shape of the web where the yarn is combined. Among them, in the case of a non-woven fabric made of the OB type, a grain is formed parallel to one direction. The OB type has an advantage that the non-woven fabric is not easily peeled off and the production cost is low.

According to one preferred embodiment of the present invention, the rolling roll cleaning apparatus of the present invention uses a cleaning member having a grain formed therein, and directions of the grains of the cleaning members used in the first and second cleaning parts are different.

Figure 3:
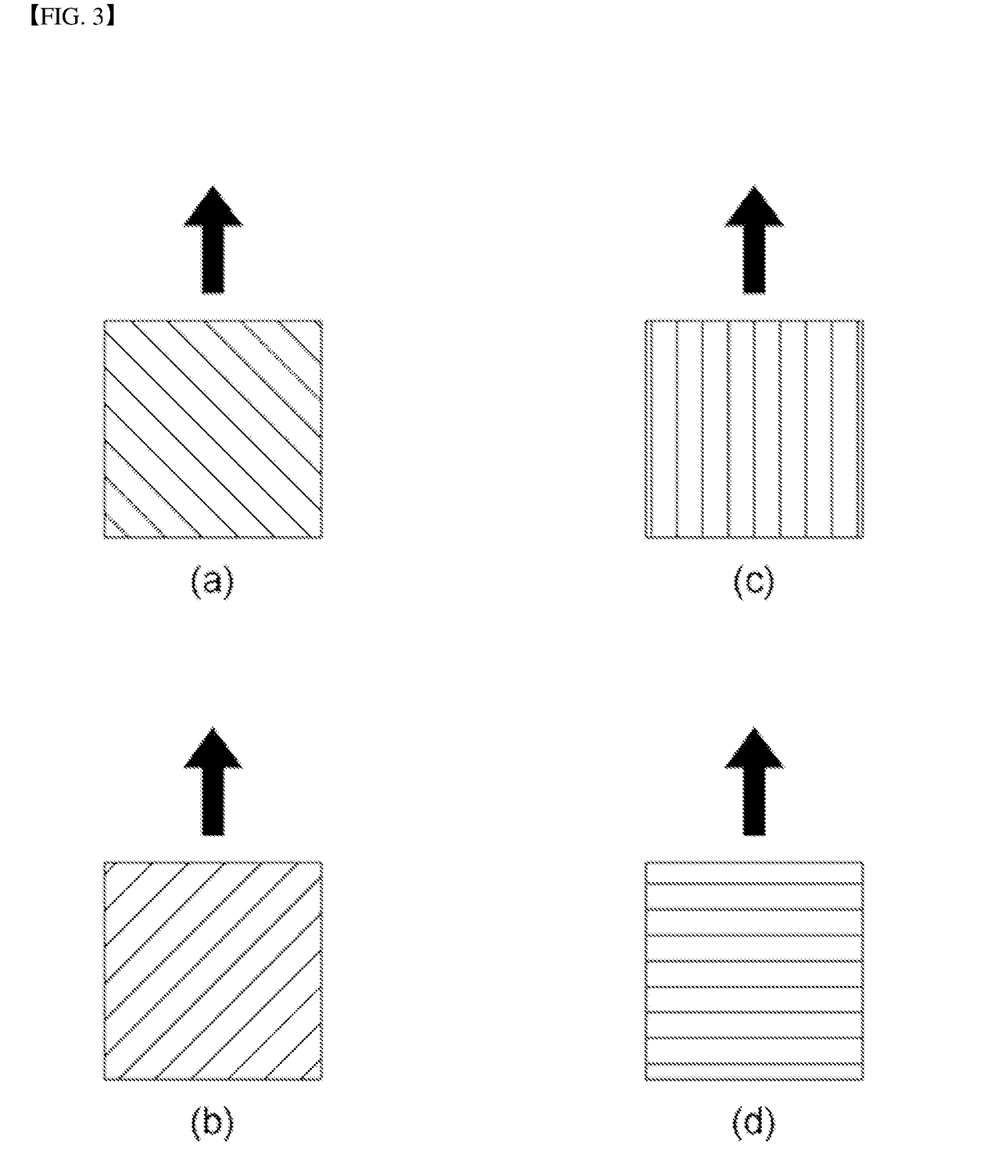
FIG. 3 shows an electrode rolling roll cleaning apparatus of the present invention, illustratively showing the moving direction of a cleaning member and the grain direction of the cleaning member according to the cleaning process.

FIG. 3 shows the direction of the grain formed on the cleaning member according to the embodiment of the present invention. When explaining in detail each cleaning member shown in FIG. 3, the arrow indicates the direction of travel of the cleaning member, (a) indicates a grain forming a 45-degree angle to the left with respect to the traveling direction, and (b) indicates a grain forming a 45-degree angle to the right with respect to the traveling direction. In addition, (c) indicates a grain formed in the same direction as the direction of travel of the cleaning member, and (d) indicates a grain formed in a direction perpendicular to the cleaning member.

When using a non-woven fabric as a cleaning member, in the manufacturing process of the non-woven fabric, first, the grain is formed, and then the grain is cut to face the desired direction, to thereby prepare the cleaning member to have grains as shown in (a), (b), (c), and (d) of FIG. 3.

According to one preferred embodiment and a comparative example of the present invention, the non-woven fabrics of (a) to (d) and/or non-grain non-woven fabrics are used as the cleaning members for the first and second cleaning part, respectively.

As a result of the experiment conducted by the applicant, when using a non-woven fabric without a grain as a cleaning member, differences in cleaning power occur due to differences in tension applied to each part of the cleaning member, which has caused partial secondary contamination during the long-term cleaning process.

On the other hand, when using a non-woven fabric having a grain formed therein as a cleaning member, the cleaning power was slightly improved compared to the non-woven fabric without a grain, but there were poorly cleaned part, depending on the grain direction.

As a result, the applicant has repeatedly studied and found that when two or more cleaning parts including cleaning members are provided and the grain direction of each nonwoven fabric used as the cleaning member is applied differently, excellent cleaning effect is shown by complementing the cleaning properties according to the grain direction.

Specifically, the grain direction of the non-woven fabric used in the first cleaning part and the grain direction of the non-woven fabric used in the second cleaning part preferably form an angle between 60 and 120 degrees when crossing each other in order to complement the cleaning characteristics according to the grain direction. More specifically, when the grain direction of each non-woven fabric is set to form an angle between 80 and 100 degrees to each other, the highest efficiency was shown.

On the other hand, if it is out of the above range, it is difficult to supplement the grain direction characteristics, so the cleaning ability may be deteriorated. For example, when the grain direction of the first and second cleaning parts is the same, the angle between crossings becomes 0 degrees or 180 degrees outside the above range. As a result of the experiment conducted by the applicant, in this case, it is difficult to substantially compensate for the part where the cleaning power decreases depending on the grain direction characteristics, and in the case of forming a similar angle, a decrease in cleaning power is also expected.

On the other hand, the direction of the grain formed on each cleaning member may be formed to form an angle of 0 to 90 degrees with respect to the traveling direction of the cleaning member as shown in FIG. 3. As a result of the experiment conducted by the present applicant, more preferable results were obtained when formed to form an angle of 30 to 60 degrees.

The rolling roll cleaning method using the rolling roll cleaning apparatus of the present invention may include the following steps.

a cleaning preparation step of preparing two or more cleaning members having different grain directions;

a cleaning liquid spray step of spraying a cleaning liquid to the cleaning member;

a cleaning step of cleaning the surface of the rolling roll by sequentially bringing the cleaning member sprayed with the cleaning liquid into contact with the rolling roll.

In addition, the rolling roll cleaning apparatus of the present invention may further selectively include one or more among a scraper pad, an air spray unit, and a heating unit. The rolling roll cleaning method according to the present invention may further include one or more of the following steps.

a scraping step of scraping off foreign materials attached to the surface of the electrode roll;

an air spray step of spraying air on the surface of the electrode rolling roll to remove residual materials;

a drying step of drying by applying heat to the surface of the electrode rolling roll.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

Copper foil with a width of 1000 mm and a thickness of 10 μm was used as the electrode current collector, and 95% by weight of carbon (electrode active material), 2.5% by weight of Super-C (conductive agent) and 2.5% by weight of SBR (binder) as an electrode mixture were added to a mixed solution of solvent CMC (carboxymethyl cellulose, water-based solvent) and distilled water to thereby prepare a mixture slurry. Thereafter, the slurry was applied to the current collector, dried and then rolled and wound to thereby prepare an electrode.

As the rolling process proceeded, the rolling roll was cleaned using a cleaning apparatus. The cleaning apparatus was used as shown in FIG. 2.

Meanwhile, as the cleaning member, non-woven fabric formed in such a manner that the grain direction is at an angle of 45 degrees to the left with respect to the moving direction was used for the first cleaning part as shown in FIG. 3(a), and non-woven fabric formed in such a manner that the grain direction is at an angle of 45 degrees to the right with respect to the moving direction was used for the second cleaning part as shown in FIG. 3(b). In addition, as the cleaning member, a material containing non-woven viscose rayon and PET in a weight ratio of 8:2 was used for non-woven fabric.

At this time, if the grain directions formed on the non-woven fabric of the first cleaning part and the nonwoven fabric of the second cleaning part are crossed with each other, they form an angle of 90 degrees to each other.

In addition, purified water was used for the first cleaning part as the cleaning liquid, and a mixture of purified water and n-octanol in a weight ratio of 8:2 was used for the second cleaning part as the cleaning liquid. The amount of the cleaning liquid used was equal as 10 ml/min for both the first cleaning part and second cleaning part.

Electrodes having a length of 10000 m were manufactured while the cleaning apparatus was operated in the manner described above.

Example 2

An electrode was manufactured while operating the cleaning apparatus in the same manner as in Example 1, except that the grain direction of the nonwoven fabric used in the first and second cleaning parts was different from that of Example 1.

As the cleaning member, a non-woven fabric with a grain direction identical to the moving direction was used for the first cleaning part as shown in FIG. 3(c), and a non-woven fabric with a grain direction perpendicular to the moving direction was used for the second cleaning part as shown in FIG. 3(d).

At this time, the grain directions of the nonwoven fabrics of the first and second cleaning parts perpendicularly cross each other to form an angle of 90 degrees.

Comparative Example 1

Electrodes were manufactured while the cleaning apparatus was operated in the same manner as in Example 1, except that a nonwoven fabric having no grain formed was used as the cleaning member for the first and second cleaning parts.

Comparative Example 2

Electrodes were manufactured while the cleaning apparatus was operated in the same manner as in Example 1, except that a nonwoven fabric having a grain in the same direction as the traveling direction was used as the cleaning member for the first and second cleaning parts as shown in FIG. 3(c).

Comparative Example 3

Electrodes were manufactured while the cleaning apparatus was operated in the same manner as in Example 1, except that a nonwoven fabric having a grain in a direction perpendicular to the traveling direction was used as the cleaning member for the first and second cleaning parts as shown in FIG. 3(d).

Comparative Example 4

Electrodes were manufactured while the cleaning apparatus was operated in the same manner as in Example 1, except that a nonwoven fabric having a grain in the direction of 45 degrees to the left in the traveling direction was used as the cleaning member for the first and second cleaning parts as shown in FIG. 3(a).

Colorimeter Measurement Experiment

Colorimeter measurements were performed on the electrode rolls that had undergone the electrode rolling and rolling roll cleaning processes according to the Examples and Comparative Examples. The L*a*b* colorimeter (Labscan XE, HauterLab Co., Ltd.) was used for each of the rolling roll before electrode rolling and the rolling roll after electrode rolling to thereby measure the initial color coordinate L* value, the electrode was manufactured based thereon, and the L* value of the rolling roll was then measured. Then, the change amount (ΔL*) of the color coordinate L* value was measured. The measurement was performed on the upper roll among the upper and lower rolls, and the results are shown in Table 1 below.

(A colorimeter is a device for measuring the color of objects known in the art. L*a*b* colorimeter was defined by International Communication on Illumination (CIE) and is a device that displays one color as a position (x, y, z) in a uniform three-dimensional color space composed of X-axis, Y-axis, and Z-axis. Since the colorimeter shows a very close difference from the eye, it is currently standardized worldwide. Among them, the color coordinate L* is a value related to the measured lightness and is displayed from 0 to 100. The a and b values are flat coordinate systems, with the horizontal axis a and the vertical axis b. The +a side is red, the −a side is green, the +b side is yellow, and the −b side is blue.)

TABLE 1

| Division | L* before rolling | L* after rolling | ΔL* |
| --- | --- | --- | --- |
| Example 1 | 85 | 70 | 15 |
| Example 2 | 85 | 68 | 17 |
| Comparative Example 1 | 85 | 45 | 40 |
| Comparative Example 2 | 85 | 57 | 28 |
| Comparative Example 3 | 85 | 52 | 33 |
| Comparative Example 4 | 85 | 58 | 27 |

As described in the results in Table 1 above,

In the case of Examples 1 and 2 in which cleaning members having different grain directions were used for the first and second cleaning parts, respectively, it is possible to effectively remove the contaminants on the surface of the rolling roll, whereby the effect of preventing secondary contamination of the electrode by foreign materials on the surface of the rolling roll can be expected.

Particularly, in the case of Example 1 in which grains are formed to have 45 degrees to the left and the right and intersect at 90 degrees, the effect was more excellent than in Example 2.

On the other hand, in the case of Comparative Example 1 of using a cleaning member having no grain formed therein and Comparative Examples 2 to 4 of using a plurality of cleaning members having the same grain direction, the cleaning effect was significantly lower than in that of Examples 1 and 2.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain the protection scope of the present invention and should be interpreted by the claims below, and it should be interpreted that all technical spirits within the equivalent scope are included in the scope of the present invention.

DESCRIPTION OF REFERENCE NUMERALS

100: electrode rolling device
110: electrode
120: rolling roll
200: rolling roll cleaning apparatus
201: upper roll
202: lower roll
203: rolling roll
204: foreign material
210: first cleaning part
220: second cleaning part
211, 221: supply roll
212, 222: winding roll
213, 223: cleaning unit
214, 224: cleaning liquid spray unit
215, 225: cleaning member
230: air spray unit
240: heating unit
250: scraping pad

The invention claimed is:

1. An apparatus for cleaning an electrode rolling roll by removing contaminants attached on the electrode rolling roll, the apparatus comprising:
   a first cleaning part configured to bring the rolling roll into contact with a first cleaning member to thereby clean the rolling roll; and
   a second cleaning part configured to clean the rolling roll by bringing the rolling roll cleaned by the first cleaning part into contact with a second cleaning member to thereby clean the rolling roll,
   wherein the first cleaning member has a first grain defined by a first direction and the second cleaning member has a second grain defined by a second direction,
   wherein each grain has only a single direction, and
   wherein the first direction is different from the second direction,
   wherein the first and second directions of the grains respectively formed on the first and second cleaning members, intersect each other with an angle of 60 to 120 degrees.

2. The apparatus of claim 1, wherein the first cleaning part and the second cleaning part each comprises:
   a supply roll configured to supply the first or the second cleaning member, respectively;
   a cleaning unit configured to bring the first or the second cleaning member, respectively, into contact with the rolling roll to thereby clean a surface of the rolling roll;
   a cleaning liquid spray unit configured to spray cleaning liquid onto the first or the second cleaning member, respectively; and
   a winding roll configured to recover the first or the second cleaning member, respectively, having cleaned the surface of the rolling roll.

3. The apparatus of claim 1, wherein the first and the second cleaning member each comprise non-woven fabric.

4. The apparatus of claim 1, wherein a direction of the first grain formed on the first cleaning member or the second grain formed on the second cleaning member is formed to have an angle of 0 to 90 degrees with respect to a moving direction of the cleaning member during cleaning.

5. The apparatus of claim 1, wherein a direction of the first grain formed on the first cleaning member or the second grain formed on the second cleaning member is formed to have an angle of 30 to 60 degrees with respect to a moving direction of the cleaning member during cleaning.

6. The apparatus of claim 1, wherein the first and second directions of the grains respectively formed on the first and second cleaning members intersect each other with an angle of 80 to 100 degrees.

7. The apparatus of claim 1, wherein the electrode rolling roll cleaning apparatus further includes a scraping pad adapted to scrape off foreign materials attached to a surface of the rolling roll.

8. The apparatus of claim 1, wherein the electrode rolling roll cleaning apparatus
further includes an air spray unit adapted to spray air to a surface of the rolling roll.

9. The apparatus of claim 1, wherein the electrode rolling roll cleaning apparatus further includes a heating unit configured to dry the rolling roll by applying heat to a surface of the rolling roll.

10. The apparatus of claim 2, wherein the cleaning liquid of the first and/or second cleaning part contains one or more selected from the group consisting of water and alcohol-based compounds.

11. The apparatus of claim 2, wherein the cleaning liquid of the first cleaning part is a cleaning liquid containing water, and
wherein the cleaning liquid of the second cleaning part is a cleaning liquid containing an alcohol-based compound.

\* \* \* \* \*